No. 888,296. PATENTED MAY 19, 1908.
R. B. BARROW.
STUMP PULLER.
APPLICATION FILED SEPT. 13, 1907.
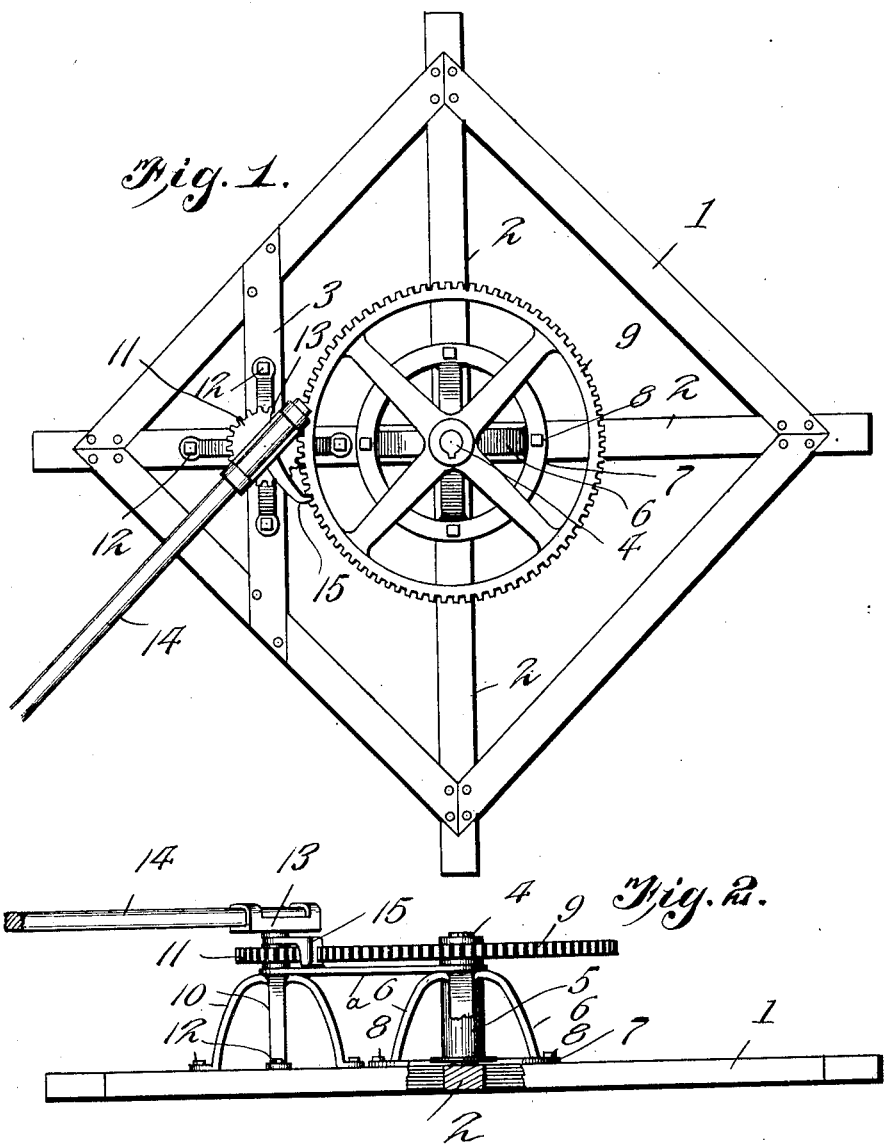
Witnesses
Louis R. Heinrichs
Inventor
Robert B. Barrow
By Victor J. Evans
Attorney

UNITED STATES PATENT OFFICE.

ROBERT B. BARROW, OF RED LEVEL, ALABAMA.

STUMP-PULLER.

No. 888,296.  Specification of Letters Patent.  Patented May 19, 1908.

Application filed September 13, 1907. Serial No. 392,749.

*To all whom it may concern:*

Be it known that I, ROBERT B. BARROW, a citizen of the United States, residing at Red Level, in the county of Covington and State of Alabama, have invented new and useful Improvements in Stump-Pullers, of which the following is a specification.

This invention relates to stump pullers and one of the principal objects of the same is to provide a stump puller of simple construction which will consist of comparatively few parts and which can be readily and quickly operated by a single person.

Another object of the invention is to provide a stump puller consisting of a gear wheel mounted upon the drum shaft and a pinion connected to a lever for operating the same.

These and other objects may be attained by means of the construction illustrated in the accompanying drawing, in which:—

Figure 1 is a top plan view of a stump puller made in accordance with my invention. Fig. 2 is a side elevation and partial section of the same.

Referring to the drawing for a more particular description of my invention, the numeral 1 designates the frame or base of the stump puller consisting of a substantially rectangular frame with a cross brace 2 and a short brace 3 extending across one corner of the main frame. The frame is adapted to be anchored in the ground in any suitable manner. Mounted centrally in the frame at the intersection of the cross bars 2 is a drum shaft 4 provided with a suitable drum 5 surrounding the shaft and said drum being supported with a skeleton frame consisting of four arms 6 united at their upper ends and provided with an aperture through which the shaft 4 passes. The lower ends of the arms 6 are formed integrally with a ring 7 which is connected by means of bolts 8 to the bars 2. Fixed rigidly to the shaft 4 is a large gear wheel 9. A brace bar *a* extends from the shaft 4 to the pinion shaft.

A skeleton frame comprising legs 10 supports the shaft for the pinion 11, said legs 10 being connected by bolts 12 to one of the cross bars 2 and to the brace bar 3, as shown more particularly in Fig. 1.

Connected to the upper end of the pinion shaft is a lever socket 13 to which the hand 14 is detachably connected and a suitable pawl 15 is mounted upon the pinion shaft and adapted to engage the teeth of the large gear wheels 9.

The operation of my invention may be briefly described as follows:—The chain connected to the stump is attached at its opposite end to the drum 5. The lever 14, which may be of sufficient length for the purpose is carried around the frame thus rotating the pinion 11 which is in mesh with the large gear wheel 9, the result being that the drum 5 is rotated and the chain wound upon the drum 5 until the stump is pulled.

My invention is of simple construction, composed of few parts and is strong, durable and efficient in use.

Having thus described the invention, what is claimed as new, is;—

A stump puller comprising a rectangular frame, cross bars connected to said frame, and a brace bar also connected with the frame, a shaft mounted at the intersection of the cross bar, a gear wheel secured to said shaft, a skeleton frame comprising legs mounted upon a ring bolted to the frame, the upper end of said legs being connected and the shaft passed through said frame, a pinion mounted upon the shaft journaled in the skeleton frame secured to the frame of the puller, a lever socket connected to said shaft, a pinion on said shaft in mesh with said gear wheel, and a pawl connected to said shaft to engage the teeth of the gear wheel, substantially as described.

In testimony whereof I affix my signature in presence of two witnesses.

ROBERT B. BARROW.

Witnesses:
D. J. LAW,
WM. V. MARTIN.